United States Patent
Zhang et al.

(10) Patent No.: US 9,485,792 B2
(45) Date of Patent: *Nov. 1, 2016

(54) SYSTEMS AND METHODS FOR FACILITATING INTRA-CELL-PEER-TO-PEER COMMUNICATION

(71) Applicant: Apple Inc., Cupertino, CA (US)

(72) Inventors: Hang Zhang, Nepean (CA); Peiying Zhu, Kanata (CA); Wen Tong, Ottawa (CA); Nimal Gamini Senarath, Ottawa (CA); Derek Yu, Kanata (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,690

(22) Filed: Oct. 21, 2015

(65) Prior Publication Data

US 2016/0073436 A1    Mar. 10, 2016

Related U.S. Application Data

(63) Continuation of application No. 13/944,264, filed on Jul. 17, 2013, now Pat. No. 9,191,978, which is a continuation of application No. 13/236,978, filed on Sep. 20, 2011, now abandoned, which is a continuation (Continued)

(51) Int. Cl.
*H04W 76/02* (2009.01)
*H04W 76/04* (2009.01)

(Continued)

(52) U.S. Cl.
CPC ........... *H04W 76/021* (2013.01); *H04W 76/04* (2013.01); *H04B 7/155* (2013.01); *H04W 12/02* (2013.01); *H04W 16/26* (2013.01); *H04W 72/00* (2013.01); *H04W 84/047* (2013.01); *H04W 88/04* (2013.01)

(58) Field of Classification Search
CPC ...................................................... H04W 88/04
USPC .................................. 370/315, 352, 338, 400
See application file for complete search history.

(56) References Cited

U.S. PATENT DOCUMENTS 5,457,680 A   10/1995 Kamm et al.
5,809,141 A   9/1998 Dent et al.
(Continued)

FOREIGN PATENT DOCUMENTS

WO   2007028339 A1   3/2007

OTHER PUBLICATIONS

Non-final Office Action for U.S. Appl. No. 11/863,778, mailed Dec. 21, 2010, 9 pages.

(Continued)

*Primary Examiner* — Andrew Lai
*Assistant Examiner* — Andrew C Lee
(74) *Attorney, Agent, or Firm* — Meyertons, Hood, Kivlin, Kowert & Goetzel, P.C.

(57) ABSTRACT

Methods and systems for providing efficient communications between two mobile stations served by the same base station or relay station are provided. A base station maintains information identifying which mobile stations it is serving. When a connection is set up between two mobile stations, if they are both being served by the same base station, the base station forwards traffic directly between the two mobile stations without forwarding it on to higher level network entities.

20 Claims, 4 Drawing Sheets

Related U.S. Application Data of application No. 11/863,778, filed on Sep. 28, 2007, now Pat. No. 8,023,446.

(60) Provisional application No. 60/827,334, filed on Sep. 28, 2006.

(51) Int. Cl.
| | | |
|---|---|---|
| H04W 84/04 | (2009.01) | |
| H04W 88/04 | (2009.01) | |
| H04W 16/26 | (2009.01) | |
| H04B 7/155 | (2006.01) | |
| H04W 12/02 | (2009.01) | |
| H04W 72/00 | (2009.01) | |

(56) References Cited

U.S. PATENT DOCUMENTS

| | | | |
|---|---|---|---|
| 6,009,328 A | 12/1999 | Muszynski | |
| 6,766,168 B1 | 7/2004 | Lim | |
| 6,928,603 B1* | 8/2005 | Castagna | H03M 13/35 714/786 |
| 6,996,083 B1 | 2/2006 | Balachandran et al. | |
| 7,363,003 B2 | 4/2008 | Takatani et al. | |
| 7,486,928 B2 | 2/2009 | Izumikawa et al. | |
| 7,577,434 B2 | 8/2009 | Nakano et al. | |
| 7,590,064 B1 | 9/2009 | Zhang et al. | |
| 7,664,878 B2 | 2/2010 | Takahashi et al. | |
| 7,680,489 B2 | 3/2010 | Chang | |
| 7,684,813 B2 | 3/2010 | Benson et al. | |
| 7,715,334 B2 | 5/2010 | Harsch | |
| 7,752,441 B2 | 7/2010 | Mizikovsky et al. | |
| 7,826,541 B2 | 11/2010 | Fujii et al. | |
| 7,872,999 B2* | 1/2011 | Saito | H04B 7/2606 370/312 |
| 7,881,276 B2 | 2/2011 | Hsu et al. | |
| 7,907,540 B2 | 3/2011 | Li et al. | |
| 7,933,236 B2 | 4/2011 | Wang et al. | |
| 7,974,227 B1 | 7/2011 | Seay | |
| 8,023,446 B2* | 9/2011 | Zhang | H04W 76/021 370/315 |
| 8,204,039 B2* | 6/2012 | Beach | H04L 63/0428 370/238 |
| 8,335,505 B2* | 12/2012 | Han | H04L 29/12028 370/254 |
| 8,463,180 B2* | 6/2013 | Jung | H04W 56/002 455/41.1 |
| 9,191,978 B2* | 11/2015 | Zhang | H04W 76/021 |
| 2001/0036810 A1 | 11/2001 | Larsen | |
| 2003/0108031 A1 | 6/2003 | Inden | |
| 2004/0029602 A1 | 2/2004 | Kunihiro | |
| 2004/0037260 A1* | 2/2004 | Kakemizu | H04L 12/4641 370/338 |
| 2004/0141491 A1 | 7/2004 | Takei et al. | |
| 2004/0174865 A1* | 9/2004 | O'Neill | H04L 12/185 370/352 |
| 2005/0047364 A1 | 3/2005 | Matsukura et al. | |
| 2005/0163146 A1* | 7/2005 | Ota | H04L 12/4633 370/432 |
| 2005/0232183 A1 | 10/2005 | Sartori et al. | |
| 2006/0050655 A1 | 3/2006 | Shi et al. | |
| 2006/0171328 A1 | 8/2006 | Ohtani et al. | |
| 2006/0264172 A1 | 11/2006 | Izumikawa et al. | |
| 2007/0014288 A1 | 1/2007 | Lim et al. | |
| 2007/0025342 A1 | 2/2007 | Obata | |
| 2007/0072604 A1* | 3/2007 | Wang | H04B 7/155 455/428 |
| 2007/0076647 A1 | 4/2007 | Kim | |
| 2007/0086407 A1 | 4/2007 | Sato | |
| 2007/0097945 A1 | 5/2007 | Wang et al. | |
| 2007/0160082 A1 | 7/2007 | Un et al. | |
| 2007/0160083 A1 | 7/2007 | Un et al. | |
| 2007/0160213 A1* | 7/2007 | Un | H04L 49/90 380/270 |
| 2007/0162610 A1* | 7/2007 | Un | H04L 1/0041 709/230 |
| 2007/0201392 A1 | 8/2007 | Ramachandran | |
| 2007/0249347 A1 | 10/2007 | Saifullah et al. | |
| 2007/0265012 A1 | 11/2007 | Sorbara et al. | |
| 2007/0280172 A1 | 12/2007 | Tan et al. | |
| 2008/0002631 A1 | 1/2008 | Ramachandran | |
| 2008/0002741 A1 | 1/2008 | Maheshwari et al. | |
| 2008/0005262 A1* | 1/2008 | Wurzburg | G06F 13/4022 709/217 |
| 2008/0025280 A1 | 1/2008 | Hsu et al. | |
| 2008/0076425 A1 | 3/2008 | Khetawat et al. | |
| 2008/0117855 A1* | 5/2008 | Choi | H04W 8/30 370/315 |
| 2008/0170535 A1 | 7/2008 | Zheng | |
| 2008/0188177 A1 | 8/2008 | Tan et al. | |
| 2008/0192756 A1* | 8/2008 | Damola | H04L 67/30 370/400 |
| 2008/0195700 A1* | 8/2008 | Jonsson | H04L 29/12009 709/203 |
| 2008/0201847 A1 | 8/2008 | Menkedick et al. | |
| 2008/0212524 A1 | 9/2008 | Niwano | |
| 2008/0268844 A1 | 10/2008 | Ma et al. | |
| 2008/0285500 A1* | 11/2008 | Zhang | H04B 7/15507 370/315 |
| 2008/0285501 A1 | 11/2008 | Zhang et al. | |
| 2008/0311904 A1 | 12/2008 | Courseille | |
| 2009/0046637 A1 | 2/2009 | Kim et al. | |
| 2009/0073913 A9 | 3/2009 | Wentink | |
| 2009/0074189 A1 | 3/2009 | Ryu et al. | |
| 2009/0117901 A1 | 5/2009 | Zhao et al. | |
| 2009/0170494 A1 | 7/2009 | Kim et al. | |
| 2009/0220079 A1 | 9/2009 | Harada et al. | |
| 2010/0020974 A1 | 1/2010 | Tsai et al. | |
| 2010/0157951 A1 | 6/2010 | Hahm et al. | |

OTHER PUBLICATIONS

Non-final Office Action for U.S. Appl. No. 11/863,778, mailed Jul. 9, 2010, 9 pages.

Notice of Allowance for U.S. Appl. No. 11/863,778, mailed Jul. 21, 2011, 4 pages.

Notice of Allowance for U.S. Appl. No. 11/863,778, mailed May 17, 2011, 4 pages.

\* cited by examiner

SYSTEMS AND METHODS FOR FACILITATING INTRA-CELL-PEER-TO-PEER COMMUNICATION

PRIORITY CLAIM

This application is a continuation of U.S. patent application Ser. No. 13/944,264, entitled "Systems and Methods for Facilitating IntraCell-Peer-to-Peer Communication", and filed on Jul. 17, 2013, which is a continuation of U.S. patent application Ser. No. 13/236,978, of the same title and filed on Sep. 20, 2011, which is a continuation of U.S. patent application Ser. No. 11/863,778, of the same title and filed on Sep. 28, 2007 (issued as U.S. Pat. No. 8,023,446 on Sep. 20, 2011), which claims the benefit of priority from U.S. Provisional Patent Application Ser. No. 60/827,334, entitled "Systems and Methods for MS-BS-MS and MS-RS-MS Operation" and filed on Sep. 28, 2006, all of which are fully incorporated herein by reference for all purposes.

BACKGROUND

1. Field of the Application

The invention relates to communications taking a path from a mobile station to a base station and back to a mobile station, or taking a path from a mobile station to a relay station and back to a mobile station.

2. Background of the Disclosure

If two mobile stations MS1 and MS2 are associated with the same base station (BS) (possibly via one or more relay stations (RS)) and MS1 wants to send data to MS2, the operation of the connections set up and data forwarding by the BS is defined herein as MS-BS-MS operation. The conventional approach to handling this is through a BSC (base station controller) or gateway server without regard to the fact that MS1 and MS2 are associated with the same BS.

SUMMARY

According to one broad aspect, the invention provides a method of facilitating intracell Peer-to-Peer Communication comprising: maintaining a CID mapping identifying each communication between two mobile stations served by a common network transceiver; upon receipt by the network transceiver of an uplink communication containing an uplink SDU, determining if there is a corresponding entry in the CID mapping table and if so, sending a downlink communication containing a corresponding downlink SDU.

In some embodiments, maintaining, determining and sending are performed in a network transceiver that is a base station.

In some embodiments, maintaining, determining and sending are performed in a network transceiver that is a relay station.

In some embodiments, the CID mapping comprises a CID mapping table, and each entry in the CID mapping table includes a source MS ID and a destination MS ID.

In some embodiments, each entry in the CID mapping table includes security information for the UL from the source MS, and security information for the DL to the destination MS.

In some embodiments, the method further comprises: upon receiving the uplink SDU, decrypting the SDU using the security information for the UL, and then re-encrypting using the security information for the DL to produce the corresponding downlink SDU.

In some embodiments, the method further comprises: maintaining a connection information table for the BS that includes all connections that are served by this BS; upon receipt of a packet from a source that is included in the connection information table for a destination that is included in the connection information table, adding an entry into the CID mapping.

In some embodiments, the method further comprises: upon receipt of first SDU for a destination that is being serviced by the same base station, establishing a downlink service flow to the destination.

In some embodiments, the downlink service flow is established using an existing security association.

In some embodiments, the downlink service flow is established using a dynamic security association.

According to another broad aspect, the invention provides a base station comprising: at least one antenna for receiving uplink communications and transmitting downlink communications; an uplink packet processor that processes uplink packets by: a) maintaining a CID mapping identifying each communication between two mobile stations served a common network transceiver; b) upon receipt by the network transceiver of an uplink communication containing an uplink SDU, determining if there is a corresponding entry in the CID mapping table; and a downlink packet processor that, upon there being a determination that there is a corresponding entry in the CID mapping table for an uplink SDU, sends a downlink communication containing a corresponding downlink SDU.

According to another broad aspect, the invention provides a relay station comprising: at least one antenna for receiving uplink communications and transmitting downlink communications; an uplink packet processor that processes uplink packets by: a) maintaining a CID mapping identifying each communication between two mobile stations served a common network transceiver; b) upon receipt by the network transceiver of an uplink communication containing an uplink SDU, determines if there is a corresponding entry in the CID mapping table; c) a downlink packet processor that, upon there being a determination that there is a corresponding entry in the CID mapping table for an uplink SDU, sends a downlink communication containing a corresponding downlink SDU.

BRIEF DESCRIPTION OF THE DRAWINGS

Embodiments of the invention will now be described with reference to the attached drawings in which.

DETAILED DESCRIPTION

Figure 1:
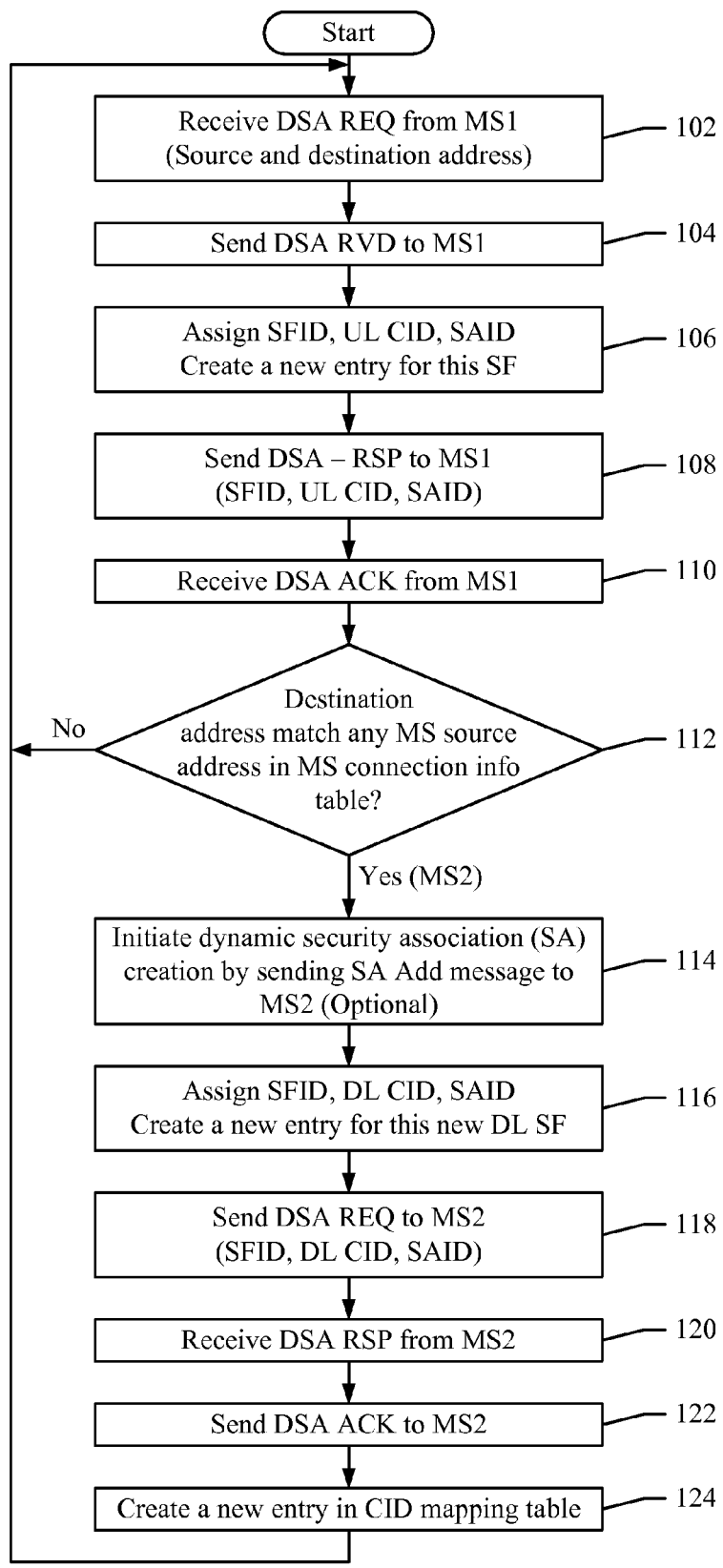
FIG. 1 is a flowchart of an example method of table creation and update MS-BS-MS Operation Flow Chart of BS-1 for a case where source and destination addresses are in CS TLV compound of RSA-XXX message.

The conventional approach to handling MS-BS-MS operation through a BSC (base station controller) or gateway server without regard to the fact that MS1 and MS2 are associated with the same BS causes unnecessary delay and resource wastage.

Embodiments of the invention provide systems and methods that provide more efficient traffic handling for the case where two MSs that are communicating are connected to the same base station or relay station.

An MS connection information Table is maintained that includes parameters for the connections of each mobile station served by the BS. In a particular example, the fields are SFID (service flow ID), UL CID (uplink connection ID), DL CID (downlink connection ID), SAID (security association ID), possibly including a (TEK) (traffic encryption key) and QoS (quality of service). The form that each of the parameters referred to might take is implementation specific. More generally, the information maintained in respect of each MS connection can be defined on an implementation specific basis. An example of a MS connection information table is provided below in Table 1.

TABLE 1

MS Connection Information Table

| MS1 (IP address or other equivalent address) | SFID | UL CID | SAID (TEK) | QoS |
|---|---|---|---|---|
| | SFID | UL CID | SAID (TEK) | QoS |
| | ... | ... | ... | ... |
| | SFID | DL CID | SAID (TEK) | QoS |
| | SFID | DL CID | SAID (TEK) | QoS |
| MS2 (IP address or other equivalent address) | SFID | UL CID | SAID (TEK) | QoS |
| | SFID | UL CID | SAID (TEK) | QoS |
| | ... | ... | ... | ... |
| | SFID | DL CID | SAID (TEK) | QoS |
| | SFID | DL CID | SAID (TEK) | QoS |
| ... | ... | ... | ... | ... |

An entry can be added to this table each time an UL or DL service flow is set up. In some embodiments, the SFID, SAID, CID and QoS are assigned by the network, for example by a base station and/or another network component.

MAC (medium access control) features are often organized into layers. One set of layers includes a convergence sub-layer (CS), common part sub-layer (CPS), and security sub-layer, although the security sub-layer is sometimes referred to as a component rather than a sub-layer. More generally, layer definitions are implementation specific.

In a specific example, the source address of a MS may be indicated in a CS source address TLV (type, length, value) in a DSA-REQ (dynamic service add request) or may be indicated in a CS destination address TLV of DL DSA-RSP (dynamic service add response).

A CID (connection identifier) mapping table is maintained that has entries that each represent a respective established communication between two MSs served by the BS. Table 2 below provides a specific example of the form such a table might take.

| MS ID (or basic ID) | UL CID | SAID (TEK) | MS ID (or basic ID) | DL CID | SAID (TEK) |
|---|---|---|---|---|---|
| ... | ... | ... | ... | ... | ... |

In the example illustrated, the first column contains the MS ID for the source, and the fourth column contains an MS ID entry (fourth column) for the destination. In some embodiments, the MS ID is a MAC ID, for example a 48 bit MAC ID. In other embodiments, the MS ID is a shorter basic ID (for example 16 bits) that is unique within the network. This is more efficient to use than the full MAC ID. Each entry in the CID mapping table indicates a UL CID and corresponding DL CID, as well as the SA parameters (SAID) for each of these connections. The UL CID is a CID for uplink traffic from a source MS to the base station for a given established communication between two MSs served by the BS. The DL CID is a CID for downlink traffic from the base station to the destination MS for the given established communication between two MSs served by the BS. In the event there is to be bi-directional communications, there would be two entries in the table, one for each direction, with the source and destination roles reversed.

The following are two examples of triggers for DL service flow set up that result in the creation of an entry in the CID mapping table.

First example: After an UL connection is setup from a MS served by a BS, if the destination address of the UL connection matches a MS's source address in the MS connection information table, then a DL service flow to the identified MS is established, and an entry is added to the CID mapping table.

Second Example: If the destination address in the very first SDU (Service data unit) on a UL connection matches a MS's source address in the MS connection info Table, then a DL service flow to the identified MS is established, and an entry is added to the CID mapping table.

In some embodiments, in order to establish the DL service flow, the BS may initiate a dynamic SA creation procedure per 7.3 (802.16d). The BS initiates DL service flow establishment procedure by sending DSx-XXX message, including the SAID, SFID, DL CID, QoS parameter set, etc. The use of dynamically assigned SA may solve a potential problem of multiple transmitters transmitting to the same receiver. In some embodiments, the PN synchronization between RS and BS is performed to avoid this potential problem.

In some embodiments, the new DL service flow is established using an existing SA. Multiple services can be mapped to a single SA (security association).

After the CID mapping table is established, L2 routing, instead of L3 routing, can be implemented to forward traffic. More specifically, the Connection ID (CID) is used to identify the destination connection, instead of using IP mapping.

Note that while the BS is described as creating the CID mapping table, more generally, any appropriate network entity may do this. Other examples include a BSC or a gateway. If an entity other than BS, creates the CID mapping table, that entity forwards the table to the BS for use in processing traffic.

For each received MAC PDU (payload data unit) on an UL connection that contains a CID listed in the CID mapping table the base station performs the following procedure:
  Decrypt the payload (privacy enabled service flow) using the corresponding UL connection TEK;
  Restore SDU;
  Create DL MAC PDU and encrypt using corresponding the DL connection TEK (for a privacy enabled connection); and
  Send the MAC PDU on the corresponding DL connection.
Extension of MS-BS-MS to MS-RS-MS In some embodiments, if the source MS and destination MS of a data flow are both attached to a common RS (possibly via other RSs) the MS-BS-MS operation described above is applied to MS-RS-MS operation.

To achieve this, whenever a new entry in a CID mapping table is created (for example by a BS), the network (for example the BS) checks to determine whether both involved MSs are attached to a common RS (possibly via other RSs).

If such an RS exists, BS forwards relevant information from the CID mapping table, for example a sub-table containing only the relevant entry, and corresponding SA materials to the RS.

At that point, the RS starts the same data forwarding operation as described above for the BS.

If a dynamic SA is established for the DL CID, there is no need for possible PN sequence number (used to identify the replay) synchronization between BS and RS. In some embodiments, the PN sequence number used by BS for other SF is identified to the RS and vice versa.

FIG. 1 is a flowchart of an example method of table creation and update MS-BS-MS Operation Flow Chart of BS-1 for a case where source and destination addresses are in CS TLV compound of RSA-XXX message. In step 102, BS-1 receives DSA REQ from MS1 including source and destination address. Then, in step 104, BS-1 sends DSA RVD to MS1. Next, in step 106, BS-1 assigns an SFID, UL CID, and SAID, and creates a new entry for the SF. In step 108, the BS-1 sends the DSA-RSP to MS1 and in step 110 receives the DSA ACK from MS1. Next, in step 112, the BS-1 checks if the destination address matches any MS source address in the MS connection information table. Assuming the destination address matches the source address of a MS2, in step 114 the BS-1 initiates dynamic security association (SA) creation by sending a SA Add message to MS2. It will be understood that step 114 is optional. Next, in step 116, the BS-1 assigns an SFID, DL CID, and SAID, and creates a new entry for this new DL SF. Then, in step 118, the BS-1 sends the DSA REQ to MS2 and in step 120 receives the DSA RSP from MS2. In step 122, the BS-1 sends a DSA ACK to MS2, and finally in step 124 creates a new entry in the CID mapping table.

Figure 2:
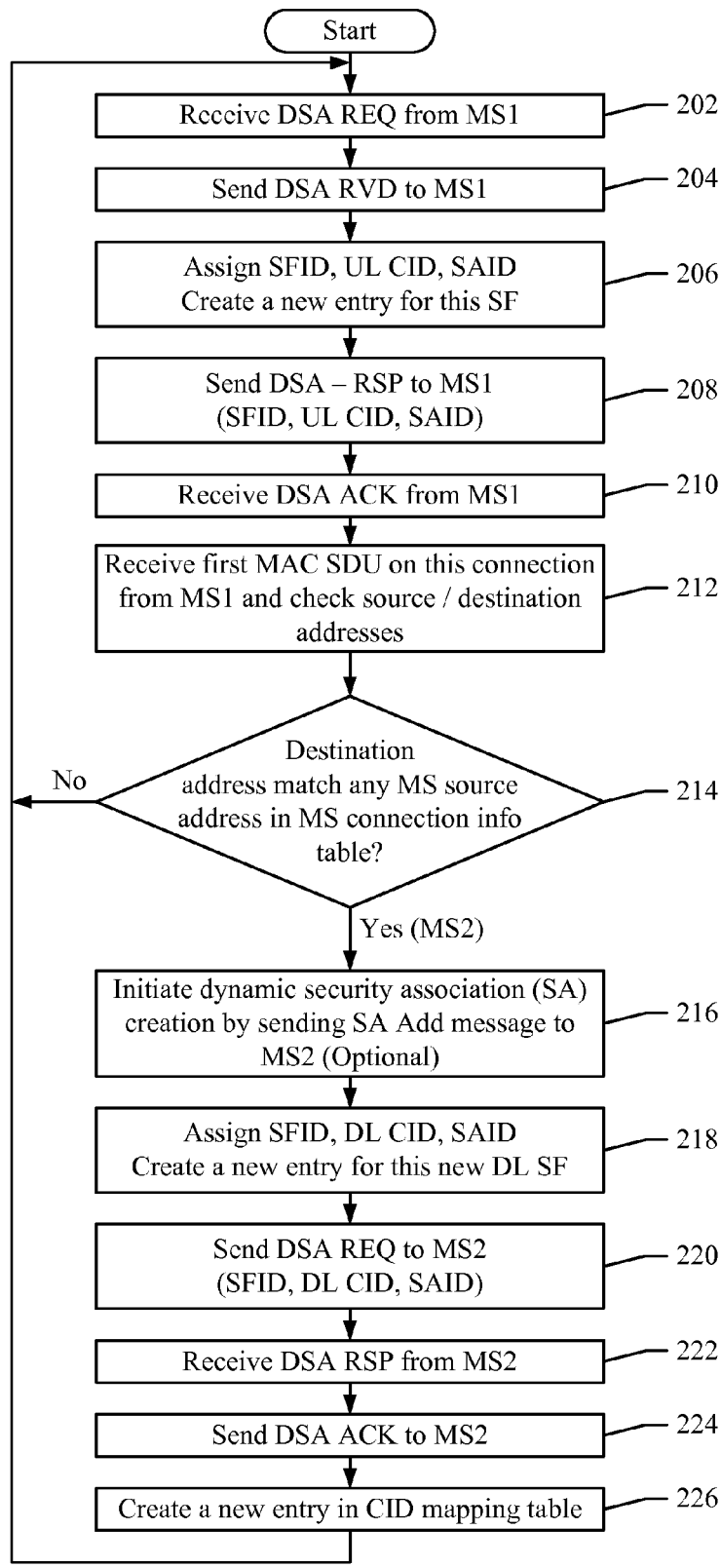
FIG. 2 is a flowchart of an example method of table creation and update MS-BS-MS Operation Flow Chart of BS-1 for a case where source and destination addresses are not in CS TLV compound of RSA-XXX message.

FIG. 2 is a flowchart of an example method of table creation and update MS-BS-MS Operation Flow Chart of BS-1 for a case where source and destination addresses are not in CS TLV compound of RSA-XXX message. In step 202, BS-1 receives DSA REQ from MS1. Then, in step 204, BS-1 sends DSA RVD to MS1. Next, in step 206, BS-1 assigns an SFID, UL CID, and SAID, and creates a new entry for the SF. In step 208, the BS-1 sends the DSA-RSP to MS1 and in step 210 receives the DSA ACK from MS1. Then, in step 212, the BS-1 receives a first MAC SDU on the connection from MS1 and checks the source/destination addresses. Next, in step 214, the BS-1 checks if the destination address matches any MS source address in the MS connection information table. Assuming the destination address matches the source address of a MS2, in step 216 the BS-1 initiates dynamic security association (SA) creation by sending a SA Add message to MS2. It will be understood that step 216 is optional. Next, in step 218, the BS-1 assigns an SFID, DL CID, and SAID, and creates a new entry for this new DL SF. Then, in step 220, the BS-1 sends the DSA REQ to MS2 and in step 222 receives the DSA RSP from MS2. In step 224, the BS-1 sends a DSA ACK to MS2, and finally in step 226 creates a new entry in the CID mapping table.

Figure 3:
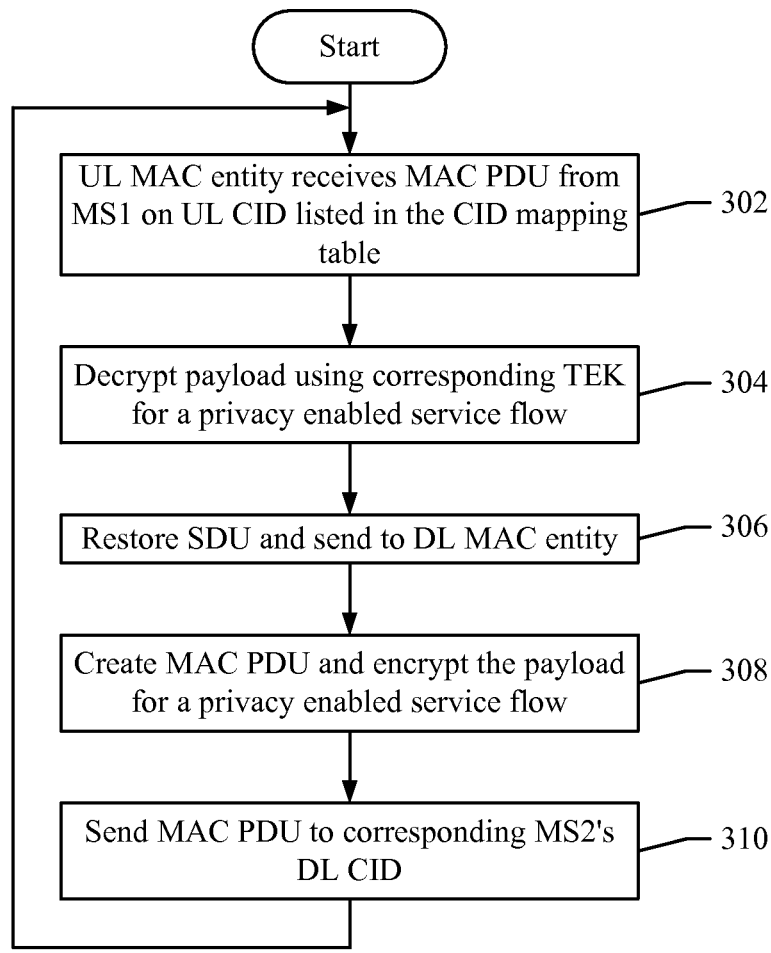
FIG. 3 is a flowchart of MS-BS-MS operation for Data forwarding.

FIG. 3 is a flowchart of MS-BS-MS operation for Data forwarding. In step 302, the UL MAC entity of the BS receives a MAC PDU from MS1 on the UL CID listed in the CID mapping table. Next, in step 304, the BS decrypts the received payload using the corresponding TEK for a privacy enabled service flow. In step 306, the SDU is restored and sent to the DL MAC entity. In step 308, the MAC PDU is created and the payload is encrypted for a privacy enabled service flow. Finally, in step 310, the created MAC PDU is sent to corresponding MS2's DL CID. The process repeats for each received MAC PDU from MS1.

MS-BS-MS Operation in Stand-Alone Mode

In some embodiments, a stand-alone mode of operation is provided that can be used in a BS when the BS has no connection with the network (e.g. no connection with other BS and any other control entities residing in network side).

In some embodiments, when this is to occur, the BS announces "enter stand-along mode" using a signaling message, which means communication can only happen among MSs/RSs associated with this BS.

MSs that have passed authorization before entering "stand alone mode", are authorized to continue MS-BS-MS communication until reauthorization. At reauthorization, MS and BS may for example use RSA based procedure per 802.16e 7.8.2. Reauthorization might take place again for example after an AK (authorization timer) expires. Reauthorization may be possible without network involvement other than the BS.

A second option is again allow it to continue, but then to disable reauthorization. In some implementations, the MSs can no longer communicate. In other cases they are allowed to continue communicating.

The procedures that are followed have been described above, the only difference being that now MSs communicate with the BS while the BS is not in communication with the network. As such, only limited communication is possible.

MS-RS-MS Operation in Stand-Alone Mode

In some instances, a RS may lose its connection with the BS (no connection with network side) due to some unpredictable reasons. In some embodiments, a mode of operation in the RS is provided that is the same as that of MS-BS-MS operation in stand-alone mode.

In some embodiments, for this implementation, the RS is configured to implement a full set of MAC common part sub-layer (CPS) and may implement part of a convergence sub-layer (CS).

Figure 4:
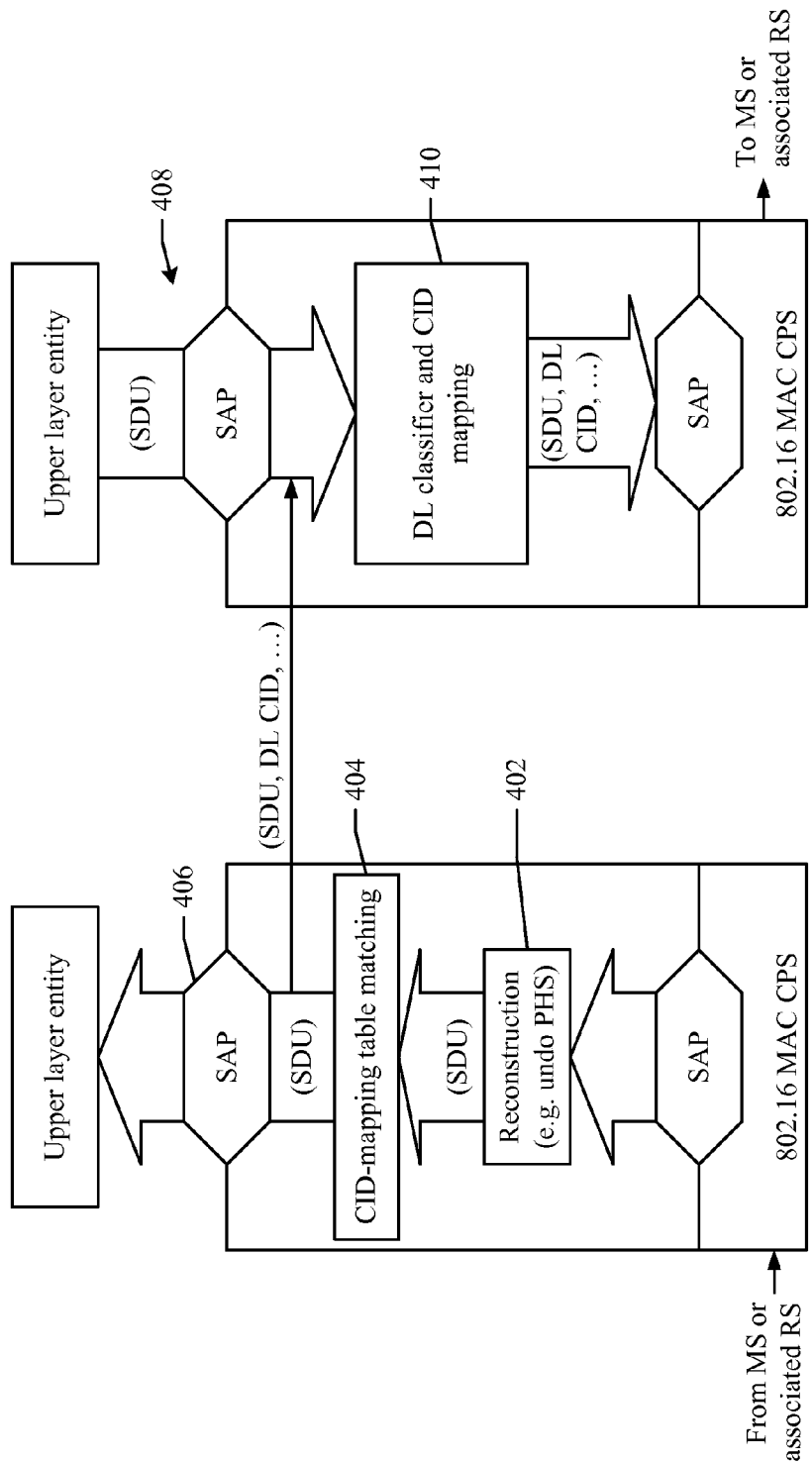
FIG. 4 is a block diagram of SDU processing.

Referring to FIG. 4, shown is a block diagram of a BS with convergence sub-layer function to enable MS-BS-MS Operation. Note that if header suppression is not implemented, the SDU and corresponding CID transfer can be moved to MAC common part sub-layer (CPS).

A route function is provided that functions as follows:

upon receiving a SDU (service data unit) from the UL, the destination address is filtered. If the destination address is within the table, the SDU is routed to a DL convergence sub-layer; otherwise routed to upper layer through SAP (service access point).

Referring again to FIG. 4, in the left hand portion of the figure:

a packet is received from an MS or associated RS; this is reconstructed 402, and then subject to destination address filtering with the table that includes all addresses covered by the BS 404. If the address is not present, the packet is passed on to the SAP (service access point) 406, and then on to an upper layer entity. If the address is present, the packet is passed over to the DL convergence sub-layer 408, this being the functionality shown in the right hand side of the figure.

In the right hand side of the drawing:

a packet is received that is destined to another address that is served by that BS. DL classification and CID mapping is performed 410, and the packet goes out to another MS or associated RS.

In another embodiment, a similar design to that of FIG. 4 is employed in a RS.

The description of MS-BS-MS and MS-RS-MS are appropriate examples for where 802.16e is used to support this operation. Any other cellular system with or without relay stations can use a similar approach.

The CID mapping table described is an appropriate example table where 802.16e is used to support MS-BS-MS and MS-RS-MS. Any other type of tables which include any other MS identity could be possible for routing packets of MS or other relay stations by BS or relay station.

What has been described is merely illustrative of the application of the principles of the invention. Other arrangements and methods can be implemented by those skilled in the art without departing from the spirit and scope of the present invention.

What is claimed is:

1. An apparatus for facilitating communications between a plurality of mobile stations, comprising;
   at least one antenna configured to receive uplink communications and to transmit downlink communications; and
   at least one processor coupled to the at least one antenna, wherein the at least one processor is configured to:
      maintain a table, wherein the table comprises mobile station identities for the plurality of mobile stations, wherein the plurality of mobile stations includes a first and a second mobile station, and wherein the plurality of mobile stations are served by a common network transceiver;
      identify first security information associated with an uplink (UL) of the first mobile station of the plurality of mobile stations and second security information associated with a downlink (DL) of the second mobile station of the plurality of mobile stations;
      receive an UL communication, via the at least one antenna, from the first mobile station, wherein the UL communication contains a UL service data unit (SDU); and
      send a DL communication, via the at least one antenna, from to the second mobile station, wherein the DL communication contains a DL SDU corresponding to the UL SDU, wherein the DL SDU is routed according to the table.

2. The apparatus of claim 1,
   wherein the at least one processor is further configured to:
      transmit a signaling message indicating that the common network transceiver is entering a stand-alone mode when the common network transceiver is disconnected from an infrastructure network.

3. The apparatus of claim 1,
   wherein the table further comprises addresses for the plurality of mobile stations.

4. The apparatus of claim 1,
   wherein the table further comprises connection identifiers for the plurality of mobile stations.

5. The apparatus of claim 1,
   wherein the at least one processor is further configured to:
      decrypt the UL SDU using the first security information for the UL of the first mobile station; and
      re-encrypt using the second security information to produce the DL SDU for the second mobile station.

6. The apparatus of claim 5,
   wherein a stand-alone mode of the common network transceiver enables communication among mobile stations and relay stations associated with the common network transceiver.

7. The apparatus of claim 1,
   wherein the at least one processor is further configured to:
      establish a DL service flow to the second mobile station.

8. The apparatus of claim 7,
   wherein the DL service flow is established using an existing security association.

9. The apparatus of claim 7,
   wherein the DL service flow is established using a dynamic security association.

10. An apparatus for facilitating communications between a plurality of mobile stations, comprising;
    at least one antenna configured to receive uplink communications and to transmit downlink communications; and
    at least one processor coupled to the at least one antenna, wherein the at least one processor is configured to:
       transmit a signaling message indicating that a common network transceiver is entering a stand-alone mode when the common network transceiver is disconnected from an infrastructure network;
       identify first security information associated with an uplink (UL) of a first mobile station of the plurality of mobile stations, wherein the plurality of mobile stations are served by the common network transceiver;
       identify second security information associated with a downlink (DL) of a second mobile station of the plurality of mobile stations;
       receive, via the at least one antenna, an UL communication from the first mobile station, wherein the UL communication contains an uplink service data unit (SDU); and
       send, via the at least one antenna, a DL communication to the second mobile station, via the at least one antenna, wherein the DL communication contains a corresponding DL SDU.

11. The apparatus of claim 10,
    wherein the at least one processor is further configured to:
       maintain a table, wherein the table comprises mobile station identities for the plurality of mobile stations, and wherein the downlink SDU is routed according to the table.

12. The apparatus of claim 11,
    wherein the table further comprises addresses for the plurality of mobile stations.

13. The apparatus of claim 11,
    wherein the table further comprises connection identifiers.

14. The apparatus of claim 10,
    wherein the at least one processor is further configured to:
       decrypt the UL SDU using the first security information for the UL of the first mobile station; and
       re-encrypt using the second security information to produce the DL SDU for the second mobile station.

15. The apparatus of claim 10,
    wherein the stand-alone mode enables communication among mobile stations and relay stations associated with the common network transceiver.

16. The apparatus of claim 10,
    wherein the at least one processor is further configured to:
       establish a DL service flow to the second mobile station, wherein the DL service flow is established using an existing security association.

17. The apparatus of claim 10,
    wherein the at least one processor is further configured to:
       establish a DL service flow to the second mobile station, wherein the DL service flow is established using a dynamic security association.

18. A method for facilitating communications between a plurality of mobile stations, comprising;

maintaining a table, wherein the table comprises mobile station identities for the plurality of mobile stations, wherein the plurality of mobile stations includes a first and a second mobile station, and wherein the plurality of mobile stations are served by a common network transceiver;

identifying first security information associated with an uplink (UL) of the first mobile station of the plurality of mobile stations and second security information associated with a downlink (DL) of a second mobile station of the plurality of mobile stations;

receiving an UL communication, via the at least one antenna, from the first mobile station, wherein the UL communication contains a UL service data unit (SDU); and sending a DL communication, via the at least one antenna, from to the second mobile station, wherein the DL communication contains a DL SDU corresponding to the UL SDU, wherein the DL SDU is routed according to the table.

19. The method of claim 18, further comprising:

transmitting a signaling message indicating that the common network transceiver is entering a stand-alone mode when the common network transceiver is disconnected from an infrastructure network.

20. The method of claim 18, wherein the table further comprises addresses and connection identifiers for the plurality of mobile stations.

\* \* \* \* \*